(12) United States Patent
Landrieve

(10) Patent No.: US 11,111,954 B2
(45) Date of Patent: Sep. 7, 2021

(54) BEARING WITH OPTICAL SENSOR AND ASSOCIATED GROOVE

(71) Applicant: Aktiebolaget SKF, Gothenburg (SE)

(72) Inventor: Franck Landrieve, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/016,761

(22) Filed: Sep. 10, 2020

(65) Prior Publication Data

US 2021/0123474 A1 Apr. 29, 2021

(30) Foreign Application Priority Data

Oct. 29, 2019 (DE) .......................... 102019216610.5

(51) Int. Cl.

| F16C 19/52 | (2006.01) |
|---|---|
| G01M 13/04 | (2019.01) |
| F16C 19/06 | (2006.01) |
| G01P 3/44 | (2006.01) |
| F16C 41/00 | (2006.01) |
| F16C 33/60 | (2006.01) |

(52) U.S. Cl.
CPC .............. *F16C 19/06* (2013.01); *F16C 19/52* (2013.01); *F16C 33/60* (2013.01); *F16C 41/007* (2013.01); *G01P 3/443* (2013.01)

(58) Field of Classification Search
CPC ...... F16C 19/06; F16C 19/188; F16C 19/381; F16C 19/52; F16C 33/60; F16C 33/7886; F16C 41/007; F16C 2300/14; F16C 2360/31; G01M 13/04; G01P 3/443

See application file for complete search history.

(56) References Cited

U.S. PATENT DOCUMENTS

| 4,092,053 | A | * | 5/1978 | Riegler | F16C 19/52 |
|---|---|---|---|---|---|
| | | | | | 384/448 |
| 6,119,504 | A | * | 9/2000 | Claus | F16C 19/16 |
| | | | | | 116/208 |
| 10,041,545 | B2 | | 8/2018 | Nicolas et al. | |
| 2008/0075399 | A1 | * | 3/2008 | Shibasaki | G01P 3/446 |
| | | | | | 384/448 |
| 2009/0256551 | A1 | | 10/2009 | Ito et al. | |
| 2019/0048937 | A1 | * | 2/2019 | Shartzer | F16C 33/585 |

FOREIGN PATENT DOCUMENTS

| FR | 3041396 B1 | 3/2018 |
|---|---|---|
| WO | 2010028630 A1 | 3/2010 |

* cited by examiner

*Primary Examiner* — Phillip A Johnson

(74) *Attorney, Agent, or Firm* — Garcia-Zamor Intellectual Property Law; Ruy Garcia-Zamor; Bryan Peckjian

(57) ABSTRACT

A bearing includes a first ring and a second ring capable of rotating concentrically relative to one another. At least one groove is formed on an axial cylindrical surface of the second ring and oriented towards the first ring. The groove is axially delimited by two side edges 50a. The bearing further includes at least one optical sensor mounted on the first ring to emit a beam oriented towards at least one of the side edges of the groove of the second ring, the optical sensor being able to detect axial positions of the side edge.

10 Claims, 2 Drawing Sheets

BEARING WITH OPTICAL SENSOR AND ASSOCIATED GROOVE

CROSS-REFERENCE TO RELATED APPLICATIONS

This application claims priority to German Patent Application no. 102019216610.5, filed Oct. 29, 2019, the contents of which is fully incorporated herein by reference.

BACKGROUND OF THE INVENTION

The present invention relates to the field of bearings. The invention notably relates to the field of large-diameter rolling bearings that can accommodate axial and radial loads, and having an inner ring and an outer ring arranged concentrically about an axis of rotation running in an axial direction.

Such large-diameter rolling bearings may be used for example in a tunnel boring machine, in a mining extraction machine or in a wind turbine.

A large-diameter rolling bearing comprises two concentric inner and outer rings, and at least two rows of rolling elements, such as rollers, arranged between the rings. Such rolling bearings are generally loaded both axially and radially, often with relatively large loads. In this case, reference is made to an orientation roller bearing or slewing roller bearing.

As a result of heavy loads, parts of the rolling bearing, more particularly raceways of the rolling elements, wear out. The wear of the rings and rolling elements leads to a significant increase of the initial bearing clearance. The wear exceeding a certain value can lead to a dramatic bearing failure.

Measuring the wear of the bearing through the clearance increase causing relative axial and radial displacement of the rings helps to predict bearing's residual life.

Such unwanted movements affect to proper functioning of the bearing and the application, with the risk that the bearing rings come in contact and collide. Other elements attached to the bearing rings may also collide.

It is common to replace the bearings when they are worn out. Such maintenance interventions are expensive, especially because of the downtime need for the machines or facilities. It is therefore desirable that such maintenance interventions are timely performed before any contact between the bearing rings, but not too early too.

In order to monitor the bearing condition during its service life, the rolling bearing disclosed in patent application FR-A1-3 041 396 comprises an annular magnetic target fixed to the inner ring, and a sensor mounted on the outer ring and facing the magnetic target. Accordingly, axial and angular relative movements between the inner and outer rings can be detected.

However, this requires the installation of the annular magnetic target on the inner ring that can be several meters diameters.

Besides, with the use of such magnetic target, measurement of the axial displacement between the inner and outer rings is affected by the radial one. As a matter of fact, when measuring axial displacement of a magnetic target, the airgap between target and sensor varies with the radial relative movement between the rings making measure less accurate or even impossible.

One aim of the present invention is to overcome these drawbacks.

SUMMARY OF THE INVENTION

It is an object of the invention to provide a bearing comprising a first ring and a second ring capable of rotating concentrically relative to one another.

According to a general feature, at least one groove is formed on an axial cylindrical surface of the second ring and is oriented towards the first ring. The groove is axially delimited by two side edges.

According to another general feature, the bearing further comprises at least one optical sensor mounted on the first ring to emit a beam towards at least one of the side edges of the groove of the second ring. The optical sensor is able to detect axial positions of the side edge.

Thanks to the invention, axial relative displacements between the rings can be accurately detected. As a matter of fact, axial positions of the groove formed on the second ring relative to the first ring are detected by the optical sensor. Besides, there is no need to mount an annular magnetic target on one of the rings. The groove may be easily machined on the associated ring.

Preferably, the groove is annular. Thus, axial relative displacements between the rings can be detected regardless the rotational position of the rings.

Advantageously, the optical sensor remains radially spaced apart from an axial cylindrical surface of the first ring which radially faces the axial cylindrical surface of the second ring from which the groove is formed. This reduces the risk that pollution, such as grease, dust, water, reaches the optical sensor.

The side edges of the groove of the second ring may extend at least in part radially.

In one embodiment, the groove comprises at least one tapered bevel extending one of the side edges and connected to the axial cylindrical surface of the second ring from which the groove is formed. With such design, pollution that could affect the measurements of the optical sensor is not retain inside the groove. However, in a variant, the groove may be deprived of such tapered bevel.

In one particular embodiment, at least one of the side edges of the groove has a stepped form with at least a first radial portion connected to the axial cylindrical surface of the second ring from which the groove is formed, and with at least a second radial portion offset axially towards the other side edge of the groove with regard to the first radial portion. With such design, pollution that could recover the first radial portion of the side groove does not affect the detection of the second radial portion positions made by the optical sensor.

Advantageously, the first ring comprises a through-hole inside which the optical sensor is disposed. The through-hole of the first ring may extend radially from an axial cylindrical surface located radially on the side opposite to the second ring, and opens on an opposite axial cylindrical surface of the first ring radially facing the axial cylindrical surface of the second ring from which the groove is formed.

Accordingly, the sensor is inserted into the through-hole and arranged in its final position in an easy way. The first ring may further comprise a plug sealing the through-hole.

In one embodiment, the bearing further comprises at least one row of rolling elements arranged between raceways provided on the first and second rings, and first and second seals disposed between the rings and delimiting together a closed rolling space inside which the row of rolling elements is housed.

Advantageously, the bearing may further comprise at least one additional seal located inside the closed rolling space and delimiting together with one of the first and second seals a closed detection space inside which opens the groove.

In one embodiment, the bearing comprises at least one row of axial rolling elements arranged between radial raceways provided on the rings, and at least one row of radial rolling elements arranged between axial raceways provided on the rings, the second ring comprising a protruding nose engaged into an annular groove of the first ring and provided with the axial raceway of the second ring.

The terms "axial rolling elements" is understood to mean rolling elements adapted to accommodate axial loads whereas the terms "radial rolling elements" is understood to mean rolling elements adapted to accommodate radial loads.

The nose of the second ring may protrude radially from the axial cylindrical surface of the second ring from which the groove is formed. The nose of the second ring may be further provided with two opposite radial flanks delimiting axially the axial cylindrical surface, one of the radial flanks delimiting at least partly the radial raceway of the second ring.

In one embodiment, the bearing comprises at least two rows of axial rolling elements each arranged between radial raceways provided on the rings, the two rows of axial rolling elements being disposed axially on each side of the nose of the second ring.

BRIEF DESCRIPTION OF THE DRAWINGS

The present invention and its advantages will be better understood by studying the detailed description of a specific embodiment given by way of a non-limiting example and illustrated by the appended drawing on which.

DETAILED DESCRIPTION OF SOME EMBODIMENTS

Figure 1:
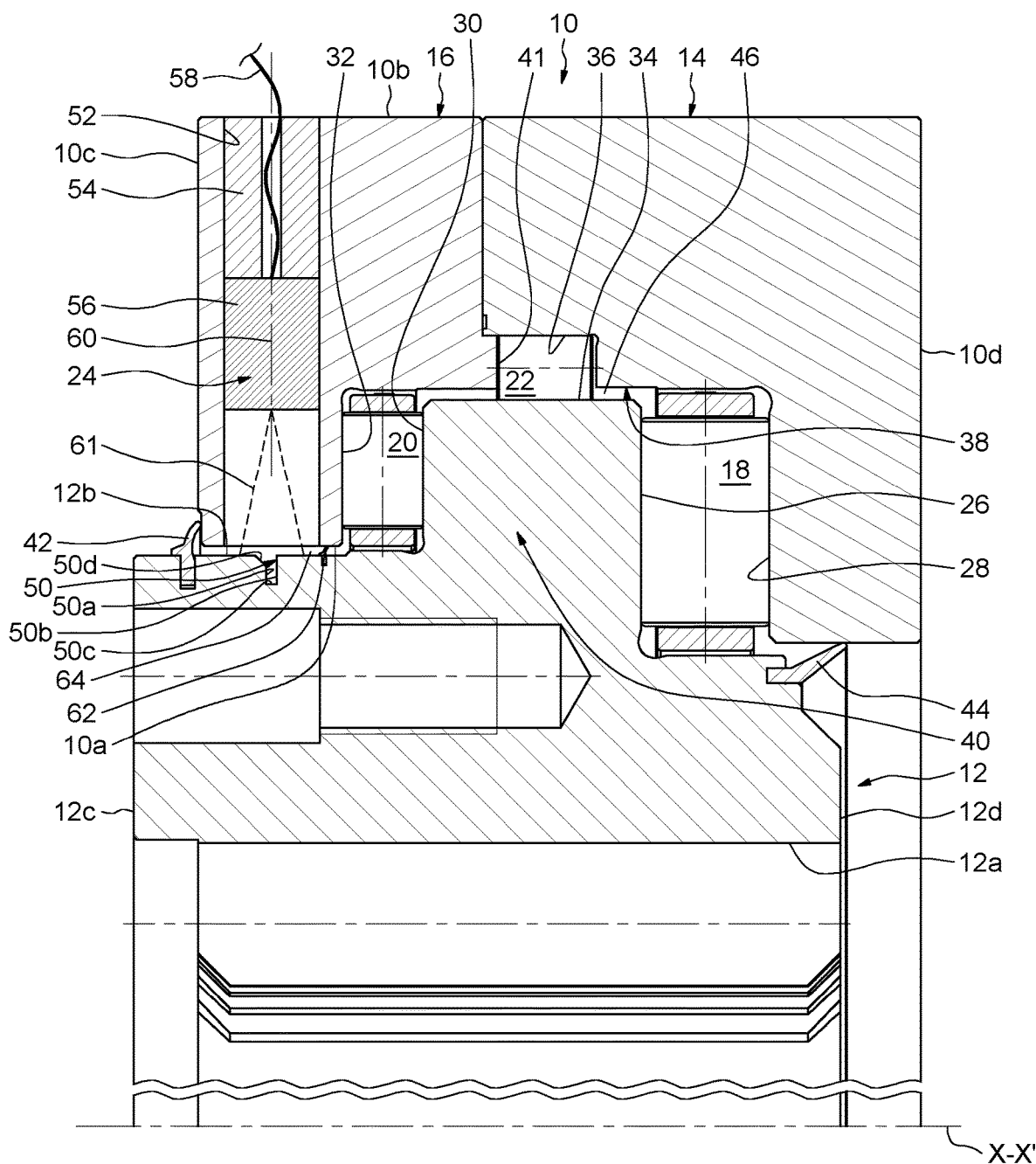
FIG. 1 is a partial cross-section of a rolling bearing according to a first example of the invention.

The rolling bearing as illustrated on FIG. 1 is a large-diameter rolling bearing comprising a first ring 10 and a second ring 12. In the illustrated example, the first ring 10 is the outer ring whereas the second ring 12 is the inner ring. The rolling bearing may for example be used in a tunnel boring machine, a wind turbine or any other applications using a large diameter rolling bearing.

The outer and inner rings 10, 12 are concentric and extend axially along the bearing rotation axis X-X' which runs in an axial direction. The rings 10, 12 are of the solid type.

The outer ring 10 is formed as a split ring and comprises a first ring 14 and a second ring 16 stacked one relative to the other in the axial direction. Each of the first and second rings 14, 16 of the outer ring is provided with a plurality of aligned through-holes (not shown) in order to be joined by fitting bolts.

In the illustrated example, the rolling bearing comprises two rows of axial rollers 18, 20 which are arranged between the outer and inner rings 10, 12 in order to form an axial thrust, and a row of radial rollers 22 which are arranged between the rings to form a radial thrust.

As will be described later, the rolling bearing also comprises an optical sensor 24 for detecting an axial relative displacement between the outer and inner rings 10, 12. In the illustrated example, the optical sensor 24 is mounted on the outer ring 10.

The rollers 18, 20, 22 of one row are identical to one another. Each roller 18, 20, 22 comprises a cylindrical outer rolling surface and two opposite frontal end surfaces delimiting the outer rolling surface. The axis of rotation of each roller 22 is parallel to the axis X-X' of the bearing and perpendicular to the axes of each or the rollers 18, 20. In the illustrated example, the axial length of the rollers 18 is larger than the one of the rollers 20. Alternatively, the axial length of the rollers 18 may be smaller than, or may be equal to, the one of the rollers 20.

The rollers 18 are arranged axially between annular radial raceways 26, 28 respectively formed on the inner and outer rings 12, 10. Each radial raceway 26, 28 has in cross section a straight internal profile in contact with the rolling surfaces of the rollers 18. The raceways 26, 28 face each other in the axial direction.

The rollers 20 are arranged axially between annular radial raceways 30, 32 respectively formed on the inner and outer rings 12, 10. Each radial raceway 30, 32 has in cross section a straight internal profile in contact with the rolling surfaces of the rollers 20. The raceways 30, 32 axially face each other. The rows of rollers 18, 20 are spaced apart from each other in the axial direction.

The rollers 22 are arranged radially between annular axial raceways 34, 36 respectively formed on the inner and outer rings 12, 10. Each axial raceway 34, 36 has in cross section a straight internal profile in contact with the rolling surfaces of the rollers 22. The raceways 34, 36 face each other in the radial direction. The row of rollers 22 is radially offset outwards with respect to the rows of rollers 18, 20. The row of rollers 22 is axially located between the rows of rollers 18, 20.

The outer ring 10 comprises an annular groove 38 opening in a radial direction inwardly towards the inner ring 12. The outer ring 10 comprises an inner stepped cylindrical surface or bore 10a from which the groove 38 is formed. The outer ring 10 also comprises an outer cylindrical surface 10b which is radially opposite to the bore 10a. The outer ring 10 further comprises two opposite radial frontal surfaces 10c, 10d which axially delimit the bore 10a and the outer surface 10b of the ring.

The inner ring 12 comprises an annular protruding nose 40 engaging into the annular groove 38 of the outer ring. The nose 40 extends radially outwards.

The inner ring 12 comprises an inner cylindrical bore 12a and a stepped outer cylindrical surface 12b which is radially opposite to the bore 12a. In the illustrated example, the bore 12a of the inner ring is provided with a gear teeth (not referenced). The inner ring 12 further comprises two opposite radial frontal surfaces 12c, 12d which axially delimit the bore 12a and the outer cylindrical surface 12b. The protruding nose 40 protrudes radially from the outer cylindrical surface 12b.

The rows of rollers 18, 20 are arranged axially between the nose 40 of the inner ring and the groove 38 of the outer ring. The rows of rollers 18, 20 are disposed on each side of the nose 40 of the inner ring. The radial raceway 26 is located on the nose 40 and on a radial portion of the outer stepped cylindrical surface 12b of the inner ring. Alternatively, the radial raceway 26 may be completely located on the nose 40. The radial raceway 30 is located on the nose 40. The radial raceways 28, 32 are located on the groove 38 of the outer ring.

More precisely, a first radial flank of the nose 40 partly delimits the radial raceway 26 for the rollers 18. A first radial flank of the groove 38, which axially faces the first radial flank of the nose 40, delimits the radial raceway 28 for the rollers 18. A second flank of the nose 40 and a facing second flank of the groove 38 respectively delimits the radial raceways 30, 32 for the rollers 20. The opposite first and second flanks of the nose 40 delimit axially the nose. Similarly, the opposite first and second flanks of the groove 38 delimit axially the groove. Each of the first and second flanks of the nose 40 extends radially the outer cylindrical surface 12b of the inner ring.

The row of rollers 22 is arranged radially between the nose 40 of the inner ring and the groove 38 of the outer ring. The axial raceways 34, 36 are respectively located on the nose 40 and the groove 38. An outer cylindrical surface of the nose 40 delimits the axial raceway 34. The outer cylindrical surface of the nose 40 and the outer cylindrical surface 12b are radially offset. As a result, the axial raceway 34 and the outer cylindrical surface 12b are also radially offset. The outer cylindrical surface of the nose 40 extends axially between the opposite radial flanks of the nose.

An axial bottom of the groove 38 delimits the axial raceway 36. In the illustrated example, an annular slot 41 is formed in the bottom of the groove 38 and delimits the axial raceway 36. The axial raceway 36 radially faces the outer cylindrical surface of the nose 40 onto which is formed the axial raceway 34.

In the illustrated example, the inner ring 12 is made in one part. Alternatively, the inner ring 12 may be divided in the axial direction in at least two separate parts secured together. In another variant, the nose 40 may be made separately from the main part of the inner ring.

As previously mentioned, the outer ring 10 is divided in the axial direction in two separate parts, the first ring 14 and the second ring 16. The first and second rings 14, 16 delimit together the groove 38. The radial raceway 28 is located on the first ring 14 and the radial raceway 32 is located on the second ring 16 of the outer ring.

The rolling bearing further comprises on each side an annular seal 42, 44 mounted on the inner ring 12 and provided to close the radial space that exists between the rings 10, 12. This radial space is defined between the bore 10a of the outer ring, and the outer cylindrical surface 12b and the outer surface of the nose 40 of the inner ring.

A closed space 46 is defined between the inner and outer ring 12, 14 and the seals 42, 44 in which the rows of rolling elements 18, 20 and 22 are housed.

Each seal 42, 44 is mounted into a groove (not referenced) formed on the outer cylindrical surface 12b of the inner ring and comes into contact with the outer ring 10. The seal 42 comes into contact with the radial frontal surface 10c of the outer ring. The seal 44 comes into contact with the bore 10a of the outer ring axially near the row of rollers 18. Alternatively, it could be possible to provide a reversed arrangement for at least one of the seals 42, 44 with the seal mounted on the outer ring 10 and coming into friction contact with the inner ring 12.

As previously mentioned, the optical sensor 24 is provided to detect an axial relative displacement between the outer and inner rings 10, 12. To this end, an annular groove 50 is also formed on the inner ring. In the illustrated example, the groove 50 is formed on the outer cylindrical surface 12b of the inner ring.

In the illustrated example, the sensor 24 radially faces the groove 50 of the inner ring. The outer ring 14 is provided with a radial through-hole 52 inside which the sensor 24 is located. The through-hole 52 extends from the outer surface 10b of the outer ring and opens on the bore 10a. The through-hole 52 radially faces the groove 50 of the inner ring.

The sensor 24 is mounted into the through-hole 52 and remains radially spaced apart from the bore 10a of the outer ring. Preferably, the shape of the through-hole 52 is complementary to that of the sensor 24.

The outer ring 10 further comprises a plug 54 which closes and seals the through-hole 52. The plug 54 is located radially into the through-hole 52. The plug 54 is secured inside the through-hole 52 by any appropriate means, for example by force-fitting. The plug 54 is flush with the outer cylindrical surface 10b of the outer ring.

The optical sensor 24 comprises a sensor body 56 mounted inside the through-hole 52 of the outer ring. The sensor body 56 is secured inside the through-hole 52 by any appropriate means, for example by force-fitting.

In the disclosed example, the optical sensor 24 also comprises an output connecting cable 58 for transmitting sensing data which extends outwards relative to the sensor body 56. The output cable 58 extends radially outwards. The plug 54 is provided with a through-opening (not referenced) wherein the output cable 58 can go through. The output cable 58 connects the sensor 24 to a control unit (not shown) so as to transmit sensed measurements. Alternatively, the sensor 24 may be deprived of such output cable in case of a wireless sensor.

The sensor body 56 of the sensor has a longitudinal axis 60 extending radially. The axis 60 also forms the optical axis of the sensor 24. The sensor 24 emits a beam 61 (illustrated schematically in dotted lines) pointed at the outer cylindrical surface 12b and the groove 50 of the inner ring.

For example, the beam emitted from the sensor 24 may be projected on the outer cylindrical surface 12b and the groove 50 of the inner ring as a line. Alternatively, the projected beam of the sensor may have other shapes, for example a circular one. For example, the beam emitted from the sensor 24 is a light or laser beam. The beam may be an invisible or a visible light beam.

The groove 50 extends radially inwards from the outer cylindrical surface 12b of the inner ring. The groove 50 is axially delimited by two side walls or edges 50a, 50b. The side edges 50a, 50b axially face each other. The side edges 50a, 50b are axially spaced apart from each other. The groove 50 also comprises a bottom 50c connected to the side edges 50a, 50b. The outer cylindrical surface 12b of the inner ring and the bottom 50c of the groove are radially offset.

In the illustrated example, the side edges 50a, 50b of the groove extend radially and the bottom 50c extends axially. The groove 50 has a rectangular shape in cross-section. Alternatively, the groove 50 may have other shapes, for example a V-shaped cross-section. In this case, the side edges 50a, 50b of the groove extend obliquely and the groove may be provided with or without the bottom 50c.

In the illustrated example, the groove 50 further comprises a tapered bevel 50d extending the side edge 50a and connected to the outer cylindrical surface 12b. This tapered bevel 50d is foreseen to not retain pollution inside the groove 50 that could affect the measurements of the sensor 24.

To this end, the rolling bearing further comprises an additional seal 62 disposed inside the closed space 46 which is delimited by the seals 42, 44. The seal 62 is axially located near to the seal 42. The seal 62 is axially disposed between the seal 42 and the row of axial rollers 20. In the illustrated example, the seal 62 is mounted into a groove (not referenced) formed on the outer cylindrical surface 12b of the inner ring and comes into contact with the outer ring 10. The seal 42 comes into contact with the bore 10a of the outer ring near to the through-hole 52. Alternatively, the seal 62 may be mounted on the outer ring 14 and come into friction contact with the inner ring 12.

Radially between the outer and inner rings 10 and 12, the seal 62 delimits together with the seal 42 a closed detection space 64 inside which open the groove 50 of the inner ring and the through-hole 52 of the outer ring. Only the groove 50 and the through-hole 52 are located inside the detection space 64. There is no row of rollers inside the detection space 64.

The beam emitted by the sensor 24 is oriented towards the outer cylindrical surface 12b of the inner ring and the groove 50, notably the side edges 50a, 50b of the groove. The light beam is reflected by the outer cylindrical surface 12b and the groove 50. The sensor 24 is able to detect side edges 50a, 50b positions. For example, the sensor 24 may comprise at least one measuring mode of edge positions. Preferably, the sensor 24 is deprived of deflector. For example, the sensor 24 may be a PosCon sensor available from Baumer.

When the side edges 50a, 50b of the groove move through the beam emitted by the sensor 24, such axial displacement of the side edges 50a, 50b is detected by the sensor. Accordingly, the axial displacement of the groove 50, and more generally of the inner ring 12, relative to the outer ring 10 is detected by the sensor 24.

Figure 2:
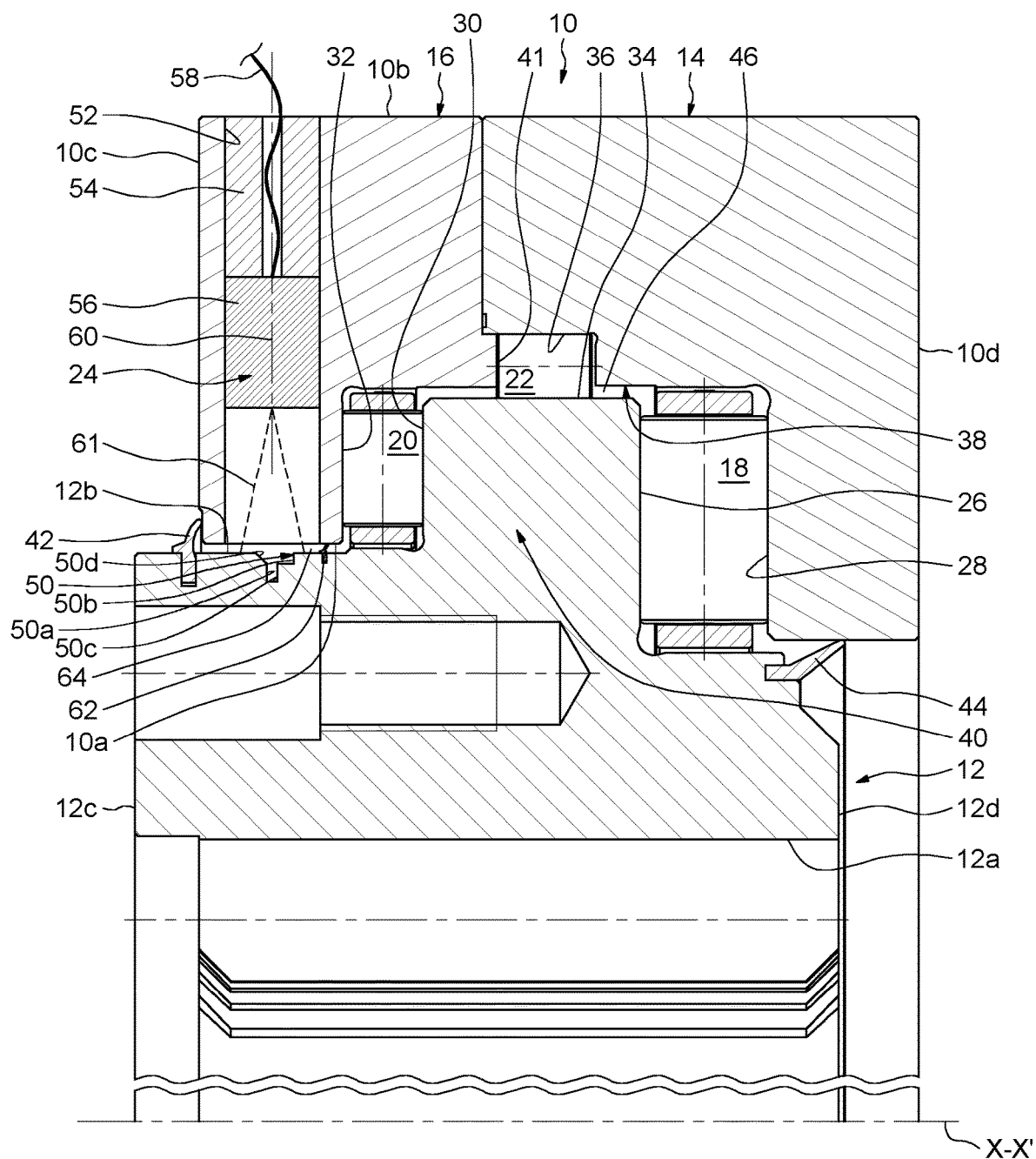
FIG. 2 is a partial cross-section of a rolling bearing according to a second example of the invention.

The example shown on FIG. 2, in which identical parts are given identical references, only differs from the previous example in that the side edge 50b of the groove 50 of the inner ring has a stepped form. The side edge 50b is provided with a first radial portion connected to the axial cylindrical surface 12b of the second ring, and with a second radial portion offset axially towards the side edge 50a with regard to the first radial portion. The second radial portion of the side edge 50b is connected to the bottom 50c. The side edge 50b is also provided with an annular axial portion extending between the first and second radial portions.

With such design of the groove, pollution that could recover the first radial portion of the side groove 50b does not affect the detection of the second radial portion positions made by the sensor 24.

In the illustrated examples, the beam emitted by the sensor 24 is oriented towards the two side edges 50a, 50b of the groove. Alternatively, the beam of the sensor 24 may be oriented towards only one of the side edges 50a, 50b.

In the illustrated examples, the optical axis 60 of the sensor extends radially. Alternatively, the optical axis 60 of the sensor may extend obliquely. However, in this case, the mounting of the sensor 24 on the outer ring may not be achieved with the radial through-hole 52. In this case, the sensor 24 may not radially face the groove 50.

In the illustrated examples, the groove 50 is formed on the outer cylindrical surface 12b of the inner ring axially between the row of axial rollers 20 and the seal 42. Alternatively, according to the design of the rolling bearing, it could be possible to provide the groove on another zone of the outer cylindrical surface 12b. In a variant, it could also be possible to provide the groove 50 on the outer cylindrical surface of the nose 40 of the inner ring onto which is formed the axial raceway 34. In this case, the sensor 24 is axially located between the row of radial rollers 22 and the row of axial rollers 20 or 18.

Otherwise, as previously mentioned, in this illustrated examples, the first ring of the rolling bearing is the outer ring 10 whereas the second ring is the inner ring 12.

As an alternative, it could be possible to provide a reversed arrangement with the first ring forming the inner ring and the second ring forming the outer ring. In this case, the groove 50 is formed on the axial inner cylindrical surface of the outer ring, which forms the bore of the outer ring, and the optical sensor 24 is mounted on the inner ring.

In the described examples, the rolling bearing is provided with three rows of rolling elements. Alternatively, the rolling bearing may comprise only one row of rolling elements, or two rows of rolling elements, or four or more rows of rolling elements. In the illustrated example, the rolling elements are rollers. The rolling bearing may comprise other types of rolling elements, for example balls. In another variant, the bearing may also be a sliding bearing having no rolling elements.

The invention claimed is:

1. A bearing comprising:
   a first ring, and
   a second ring capable of rotating concentrically relative to one another,
   at least one groove formed on an axial cylindrical surface of the second ring and oriented towards the first ring, the groove being axially delimited by two side edges,
   at least one optical sensor mounted on the first ring to emit a beam oriented towards at least one of the side edges of the groove of the second ring, the optical sensor being able to detect axial positions of the at least one of the side edges.

2. The bearing according to claim 1, wherein the groove of the second ring is annular.

3. The bearing according to claim 1, wherein the optical sensor remains radially spaced apart from an axial cylindrical surface of the first ring which radially faces the axial cylindrical surface of the second ring on which the groove is formed.

4. The bearing according to claim 1, wherein the side edges of the groove of the second ring extend at least in part radially.

5. The bearing according to claim 4, wherein the groove of the second ring comprises at least one tapered bevel extending one of the side edges and connected to the axial cylindrical surface of the second ring on which the groove is formed.

6. The bearing according to claim 4, wherein at least one of the side edges of the groove has a stepped form with at least a first radial portion connected to the axial cylindrical surface of the second ring on which the groove is formed, and with at least a second radial portion offset axially towards the other side edge of the groove with regard to the first radial portion.

7. The bearing according to claim 1, wherein the first ring comprises a through-hole inside which the optical sensor is disposed.

8. The bearing according to claim 7, wherein the through-hole of the first ring extends radially from an axial cylindrical surface located radially on the side opposite to the second ring, and opens on an opposite axial cylindrical surface of the first ring radially facing the axial cylindrical surface of the second ring on which the groove is formed.

9. The bearing according to claim 1, further comprising at least one row of rolling elements arranged between raceways provided on the first and second rings, and first and second seals disposed between the rings and delimiting together a closed rolling space inside which the row of rolling elements is housed, the rolling bearing further comprising at least one additional seal located inside the closed rolling space and delimiting together with one of the first and second seals a closed detection space inside which opens to the groove.

10. The bearing according to claim 1, comprising at least one row of axial rolling elements arranged between radial raceways provided on the rings, and at least one row of radial rolling elements arranged between axial raceways provided on the rings, the second ring comprising a protruding nose engaged into an annular groove of the first ring and provided with the axial raceway of the second ring, the nose protruding radially from the axial cylindrical surface of the second ring on which the groove is formed.

* * * * *